United States Patent
Shwartz et al.

(10) Patent No.: US 11,075,954 B2
(45) Date of Patent: Jul. 27, 2021

(54) IDENTIFYING SYSTEMS WHERE A POLICY AS A CODE IS APPLICABLE

(71) Applicant: International Business Machines Corporation, Armonk, NY (US)

(72) Inventors: Larisa Shwartz, Greenwich, CT (US); Sander Plug, Noordwijk (NL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/146,600

(22) Filed: Sep. 28, 2018

(65) Prior Publication Data

US 2020/0106810 A1    Apr. 2, 2020

(51) Int. Cl.

| G06F 21/00 | (2013.01) |
|---|---|
| H04L 29/06 | (2006.01) |
| G06F 21/62 | (2013.01) |
| G06N 20/00 | (2019.01) |
| G06F 40/20 | (2020.01) |

(52) U.S. Cl.
CPC .......... *H04L 63/20* (2013.01); *G06F 21/6218* (2013.01); *G06F 40/20* (2020.01); *G06N 20/00* (2019.01)

(58) Field of Classification Search
None
See application file for complete search history.

(56) References Cited

U.S. PATENT DOCUMENTS

| 7,900,155 | B2 | 3/2011 | Sauermann |
| 8,020,104 | B2 * | 9/2011 | Robarts .................... G06F 3/016 715/744 |
| 8,627,403 | B1 | 1/2014 | Kirshenbaum et al. |
| 8,656,478 | B1 * | 2/2014 | Forristal ................. H04L 63/20 726/12 |

(Continued)

OTHER PUBLICATIONS

Dias, Pedro et al. Enforcing history-based security policies in mobile agent systems. Proceedings Policy 2003. IEEE 4th International Workshop on Policies for Distributed Systems and Networks. https://ieeexplore.ieee.org/stamp/stamp.jsp?tp=&arnumber=1206977 (Year: 2003).*

(Continued)

*Primary Examiner* — Jeremiah L Avery
(74) *Attorney, Agent, or Firm* — Amin, Turocy & Watson, LLP

(57) ABSTRACT

Techniques regarding identifying one or more systems where a policy as a code can be applicable are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a matching component, operatively coupled to the processor, that can determine whether a policy as a code is enforceable on a computing entity based on a comparison of a plurality of commands executed on the computing entity and a plurality of actions extracted from the code.

20 Claims, 10 Drawing Sheets

(56) References Cited

U.S. PATENT DOCUMENTS

| | | | | |
|---|---|---|---|---|
| 8,793,758 | B2* | 7/2014 | Raleigh | H04W 12/088 |
| | | | | 726/1 |
| 8,949,668 | B2 | 2/2015 | Hanks et al. | |
| 9,009,834 | B1 | 4/2015 | Ren et al. | |
| 9,043,770 | B2 | 5/2015 | Aliseychik et al. | |
| 9,369,488 | B2 | 6/2016 | Woods et al. | |
| 10,165,447 | B2* | 12/2018 | Raleigh | G06Q 20/40 |
| 2014/0006347 | A1* | 1/2014 | Qureshi | H04W 4/029 |
| | | | | 707/621 |
| 2014/0359691 | A1 | 12/2014 | Woods et al. | |
| 2018/0069899 | A1* | 3/2018 | Lang | G06F 8/38 |
| 2018/0307859 | A1* | 10/2018 | LaFever | G16H 10/60 |
| 2019/0020685 | A1* | 1/2019 | Pletcher | H04L 63/20 |

OTHER PUBLICATIONS

Badr, N. et al. Policy-based autonomic control service. Proceedings. Fifth IEEE International Workshop on Policies for Distributed Systems and Networks, 2004. Policy 2004. https://ieeexplore.ieee.org/stamp/stamp.jsp?tp=&arnumber=1309154 (Year: 2004).*

Montanari, Rebecca; Tonti, Gianluca. A policy-based infrastructure for the dynamic control of agent mobility. Proceedings Third International Workshop on Policies for Distributed Systems and Networks. https://ieeexplore.ieee.org/stamp/stamp.jsp?tp=&arnumber=1011309 (Year: 2002).*

Kanter, Max., et al. "Machine Learning 2.0 Engineering Data Driven AI Products" arXiv:1807.00401 [cs.AI] Mar. 3, 2018. 22 pages.

Sapp, Carlton, E. "Preparing and Architecting for Machine Learning." Gartner, Technical Professional Advice, Jan. 17, 2017. 37 pages.

Ebtekar, Ali., et al. "Natural Language Based User Interface for Policy Authoring and Management Systems." The IP.com Prior Art Database, Jul. 27, 2017. 12 pages.

International Business Machines Corporation "User Model Role Based Policies." The IP.com Prior Art Database. Jul. 3, 2009. 6 pages.

"Automatic Categorization of IT Infrastructure Service Management Data using Natural Language Processing and Machine Learning Anonymously." iThe IP.com Prior Art Database, Feb. 18, 2016. 7 pages.

Mell, Peter, et al. "The NIST Definition of Cloud Computing." National Institute of Standards and Technology. Sep. 2011. 7 pages.

* cited by examiner

IDENTIFYING SYSTEMS WHERE A POLICY AS A CODE IS APPLICABLE

BACKGROUND

The subject disclosure relates to identifying systems where a policy as a code is applicable, and more specifically, identifying one or more computing entities upon which a policy as a code can be enforced based on one or more commands executed on the computing entities and/or actions comprised within the policy as a code.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate autonomous identification of one or more computer systems where a policy as a code can be applicable are described.

According to an embodiment, a system is provided. The system can comprise a memory that can store computer executable components. The system can also comprise a processor, operably coupled to the memory, and that executes the computer executable components stored in the memory. The computer executable components can comprise a matching component, operatively coupled to the processor, that can determine whether a policy as a code is enforceable on a computing entity based on a comparison of a plurality of commands executed on the computing entity and a plurality of actions extracted from the code.

According to an embodiment, a computer-implemented method is provided. The computer-implemented method can comprise determining, by a system operatively coupled to a processor, whether a policy as a code is enforceable on a computing entity based on a comparison of a plurality of commands executed on the computing entity and a plurality of actions extracted from the code.

According to an embodiment, a computer program product for identifying a computing entity where a policy as a code is applicable is provided. The computer program product can comprise a computer readable storage medium having program instructions embodied therewith. The program instructions can be executable by a processor to cause the processor to determine, by a system operatively coupled to the processor, whether the policy as the code is enforceable on the computing entity based on a comparison of a plurality of commands executed on the computing entity and a plurality of actions extracted from the code.

DETAILED DESCRIPTION

Figure 1:
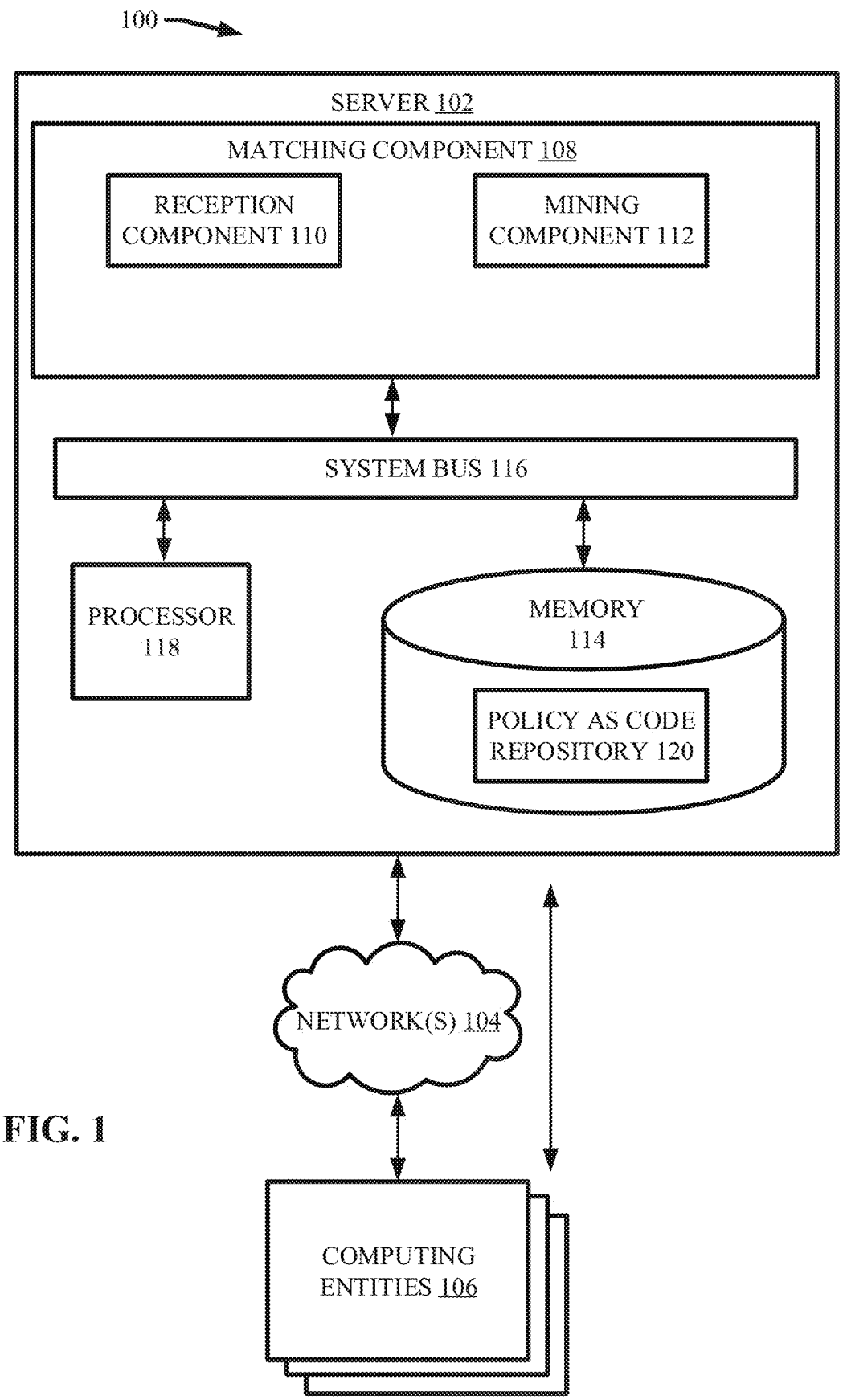
FIG. 1 illustrates a block diagram of an example, non-limiting system that can autonomously determine whether a policy as code is applicable on a subject computing entity in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more policies can be implemented to facilitate a user in executing a variety of functions on a computing entity. For example, policies can enforce dynamic automation, monitoring standards, compliance standards, and/or the like. Further, by writing the policies as a computer readable code, the policies can be automatically executed by the computing entity to perform and/or regulate repeated operations. Thus, a policy as a code can be a policy written in a computer readable language (e.g., a code) to facilitate automation of one or more tasks commonly repeated on a subject computing entity.

While established policies as a code can expedite and/or standardize various functions performed on a subject computing entity; development of the policies as a code can be time consuming. Additionally, verifying that an existing policy as a code can be applicable to a subject computing entity and/or function can be too labor intensive to be performed manually in an efficient manner.

Various embodiments of the present invention can be directed to computer processing systems, computer-implemented methods, apparatus and/or computer program products that facilitate the efficient, effective, and autonomous (e.g., without direct human guidance) determine whether an existing policy as a code can be applicable to one or more computing entities. For example, one or more embodiments described herein can regard analyzing one or more pre-existing policies as a code to identify one or more actions defined by the code that can be compared to past commands executed on a subject computing entity. Further, the comparison can be performed via multiple iterations in which each iteration can compare the past commands with a respective set of actions extracted from the code.

The computer processing systems, computer-implemented methods, apparatus and/or computer program products employ hardware and/or software to solve problems that are highly technical in nature (e.g., determining whether a policy as a code is applicable to a subject computing entity), that are not abstract and cannot be performed as a set of mental acts by a human. For example, a human, or even a plurality of humans, can not efficiently identify one or more computing systems where a pre-existing policy as a code is applicable. For instance, an analysis of all the actions comprised within a policy as a code and a comparison of the actions with regards to an analysis of past commands of a computing entity can encompass a vast amount of data that cannot be proficiently processed using manual techniques.

FIG. 1 illustrates a block diagram of an example, non-limiting system 100 that can facilitate identifying one or more systems where one or more pre-existing policies as a code are applicable. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more computing entities 106. The server 102 can comprise matching component 108. The matching component 108 can further comprise reception component 110 and/or mining component 112. Also, the server 102 can comprise or otherwise be associated with at least one memory 114. The server 102 can further comprise a system bus 116 that can couple to various components such as, but not limited to, the matching component 108 and associated components, memory 114 and/or a processor 118. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more computing entities 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the matching component 108 can be provided on the one or more servers 102, it should be appreciated that the architecture of system 100 is not so limited. For example, the matching component 108, or one or more components of matching component 108, can be located at another computer device, such as another server device, a client device, etc.

The one or more computing entities 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, cloud computing devices, internet of things devices (e.g., smart residential and/or commercial appliances), WiFi routers, solar inverter systems, automobiles, roadway sensors, medical devices (e.g., hearing aids and/or pacemakers), a combination thereof, and/or the like. One of ordinary skill in the art will recognize that a wide variety of computerized devices (e.g., including devices that operate in accordance with one or more program instructions) can comprise the one or more computing entities 106 and the example devices described herein in not an exhaustive list. A user of the system 100 can utilize the one or more computing entities 106 to execute one or more commands that can dictate one or more computer functions. In various embodiments, the commands can be entered: manually by a user of the one or more computing entities 106, by one or more computer readable program instructions, by one or more artificial intelligence algorithms (e.g., one or more machine learning technologies), a computerized device (e.g., a cloud computing entity), a combination thereof, and/or the like. Additionally, the one or more computing entities 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In one or more embodiments, the one or more computing entities 106 can record the one or more commands in archive. For example, the one or more commands can be stored in one or more audit logs, which can be generated, maintained, and/or updated by the one or more computing entities 106.

The reception component 110 can facilitate communication between the one or more computing entities 106 and the one or more servers 102, the matching component 108, and/or associate components (e.g., mining component 112). The reception component 110 can be operatively coupled to the one or more computing entities 106 directly (e.g., via an electrical connection) or indirectly (e.g., via the one or more networks 104). Additionally, the reception component 110 can be operatively coupled to one or more components of the server 102 (e.g., one or more component associated with the matching component 108, system bus 116, processor 118, and/or memory 114) directly (e.g., via an electrical connection) or indirectly (e.g., via the one or more networks 104).

The mining component 112 can analyze one or more pre-existing policies as a code to extract a plurality of actions comprised within the code. The one or more pre-existing policies as a code can be stored in a policy as a code repository 120. The policy as a code repository 120 can include one or more digital repositories that can comprise: one or more policies as a code, one or more definitions utilized in the one or more policies as a code, one or more manual pages regarding the one or more policies as a code, data from one or more public domains (e.g., one or more websites that describe actions which can be used to classify action and/or command states), a combination thereof, and/or the like. In one or more embodiments, the policy as a code repository 120 can be comprised within the memory 114 located on the one or more servers 102. In one or more embodiments, the policy as a code repository 120 can be located in a cloud computing environment and accessed by the mining component 112 via the one or more networks 104. The mining component 112 can retrieve a subject policy as a code and/or the code's associate data (e.g., definitions and/or manual pages) from the policy as a code repository 120.

In various embodiments, the mining component 112 can identify action states for the various actions comprising a subject policy as a code. For example, the mining component 112 can identify actions within a policy as a code as change actions or verify actions. As used herein, the term "change action" can refer to an action comprised within a policy as a code that can direct a computing entity 106 executing the action to change a state of an entity. Example actions that can be directed by a change action can include, but are not limited to: changing a variable, stopping a process, starting a process, removing a file, creating a file, a combination thereof, and/or the like. As used herein, the term "verify action" can refer to an action comprised within a policy as a code that can direct a computing entity 106 executing the action to interact with an entity and/or, for example, inquire as to the state of the entity. Further, the mining component 112 can extract a plurality of actions from a subject policy as a code based on the identified action state of the actions comprised within the code.

The mining component 112 can preprocess the policy as a code using one or more artificial intelligence technologies such as natural language processing ("NLP") techniques to identify the actions comprised within the policy as a code. In various embodiments, the mining component 112 can use one or more action descriptions in one or more manual pages of the policy as a code to identify words and/or phrases that describe actions. For example, the mining component 112 can implement one or more NLP algorithms and/or techniques such as, but not limited to: StanfordNLPAnnotator, Part Of Speech tagging, Part Of Speech selection, frequency analysis, derivation techniques, a combination thereof, and/or the like. Further, the mining component 112 can analyze one or more phrases from the policy as a code and apply one or more part-of-speech filters and/or diverse criteria filters (e.g., length and/or frequency) to identify actions comprised within the code. Thus, the mining component 112 can generate a list of candidate phrases within the policy as a code that can describe actions to be performed by the policy as a code.

Additionally, the mining component 112 can analyze the list of candidate phrases to determine whether the candidate phrases describe a change action or a verify action. For example, the mining component 112 can identify an action state (e.g., a change action and/or a verify action) based on the presence of one or more domain-specific words and/or phrases included in the subject candidate phrase. In another example, the mining component 112 can identify an action state (e.g., a change action and/or a verify action) based on the presence of words and/or phrases delineating an operation (e.g., create, read, update, and/or delete) with a known action state. For instance, wherein creation operations are known to be change actions, candidate phrases comprising words and/or phrases delineating a creation operation (e.g., comprising the word "create") can be identified by the mining component 112 as describing a change action. Additionally, the mining component 112 can identify an action state (e.g., a change action and/or a verify action) based on the presence of a synonym of words and/or phrases delineating an operation with a known action state. Moreover, the mining component 112 can identify an action state based the presence of words and/or phrases that can convert actions typically identified as a first action state into another action state. For instance, words and/or phrases such as "help" and/or "version" can convert actions that can typically be identified as change actions into verify actions.

In one or more embodiments, the mining component 112 can generate a confidence value with each identification of an action state. The confidence value can regard a measure of confidence that an identified action state is classified accurately. For example, the mining component 112 can search for additional words (e.g., verbs) and/or phrases extracted from descriptions of already classified actions in the description of all classified actions and/or use the frequency of these additional words and/or phrases to establish a confidence value. For instance, wherein the mining component 112 finds the verb "affect" in eight actions identified as change actions and two actions yet to be classified, the mining component 112 can generate a confidence value of 80 percent that the presence of the verb "affect" delineates a change action. In another instance, wherein the mining component 112 finds the verb "affect" in four actions identified as change actions and 3 actions yet to be classified, the mining component 112 can generate a confidence value of 40 percent that the presence of the verb "affect" delineates a change action. Words and/or phrases described by confidence values below a predefined threshold (e.g., a user defined threshold) can be presented to a subject matter expert (e.g., a system administrator) to verify and/or correct a learned classification.

Thus, in various embodiments the mining component 112 can generate knowledge regarding a pre-existing policy as a code by identifying actions comprised within the code and classifying the actions as change actions or verify actions. The mining component 112 can use, for example, action descriptions in one or more manual pages associated with the pre-existing policy as a code to recognize words and/or phrases that can describe actions and thereby identify actions within the code. Further, the mining component 112 can use, for example, various NPL techniques to identify the actions as change actions or show actions. Moreover, the mining component 112 can enable one or more subject matter experts to verify and/or correct one or more learned classifications used to identify action states.

Figure 2:
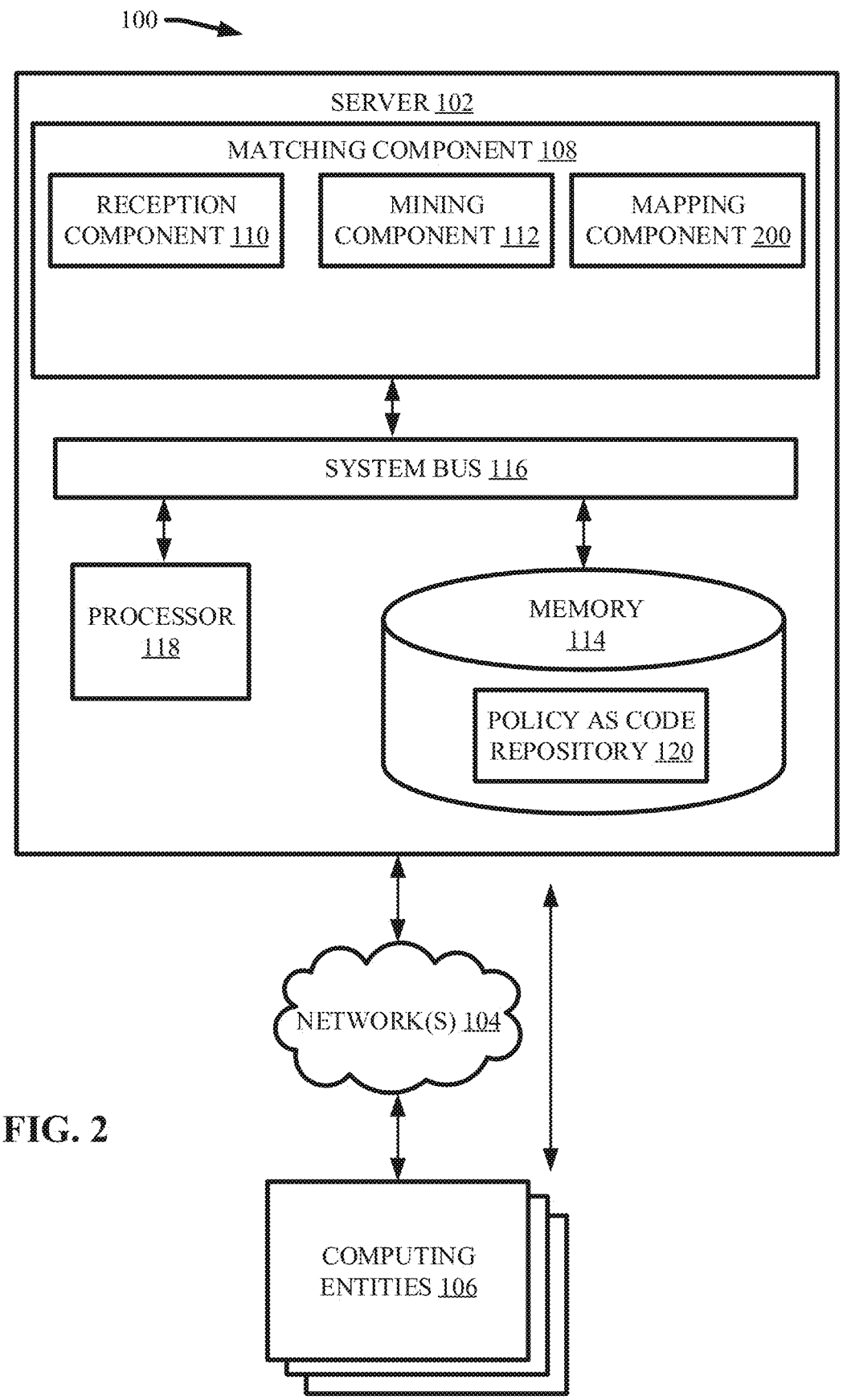
FIG. 2 illustrates a block diagram of an example, non-limiting system that can autonomously determine whether a policy as code is applicable on a subject computing entity in accordance with one or more embodiments described herein.

FIG. 2 illustrates a diagram of the example, non-limiting system 100 further comprising a mapping component 200 that can analyze a plurality of commands executed on the one or more computing entities 106 in accordance with one or more embodiments described herein. Repetitive description of like elements employed in other embodiments described herein is omitted for sake of brevity.

The mapping component 200 can analyze a command history and/or evidence thereof from the one or more computing entities 106 to identify a plurality of commands. For example, the command history can be comprised within an audit log generated by the one or more computing entities 106. In one or more embodiments, the mapping component 200 can analyze the command history to identify a plurality of commands that can be a part of a reoccurring pattern. For example, the mapping component 200 can identify the plurality of commands based on previous repetitions of a sequence of commands and/or a particular group of commands.

In various embodiments, the mapping component 200 can further identify command states for the plurality of commands identified from the command history. For example, the mapping component 200 can identify commands as change commands or verify commands. As used herein, the term "change command" can refer to a command comprised within a command history that can direct a computing entity 106 executing the command to change a state of an entity. Example commands that can be directed by a change command can include, but are not limited to: changing a variable, stopping a process, starting a process, removing a file, creating a file, a combination thereof, and/or the like. As used herein, the term "verify command" can refer to a command comprised within a command history that can direct a computing entity 106 executing the command to interact with an entity and/or, for example, inquire as to the state of the entity.

The mapping component 200 can analyze the plurality of commands using one or more artificial intelligence technologies such as NLP techniques to facilitate classification of the commands from the plurality of identified commands. For example, the mapping component 200 can implement one or more NLP algorithms such as, but not limited to: StanfordNLPAnnotator, Part Of Speech tagging, Part Of Speech selection, frequency analysis, derivation techniques, a combination thereof, and/or the like. Further, the mapping component 200 can analyze one or more phrases from the plurality of commands and apply one or more part-of-speech filters and/or diverse criteria filters (e.g., length and/or frequency) to identify command states.

Additionally, the mapping component 200 can identify a command state (e.g., a change command and/or a verify command) based on the presence of one or more domain-specific words and/or phrases included in the subject command. In another example, the mapping component 200 can identify a command state (e.g., a change command and/or a verify command) based on the presence of words and/or phrases delineating an operation (e.g., create, read, update, and/or delete) with a known command state. For instance, wherein creation operations are known to be change commands, commands comprising words and/or phrases delineating a creation operation (e.g., comprising the word "create") can be identified by the mapping component 200 as describing a change command. Additionally, the mapping component 200 can identify a command state (e.g., a change command and/or a verify command) based on the presence of a synonym of words and/or phrases delineating an operation with a known command state. Moreover, the mapping component 200 can identify a command state based the presence of words and/or phrases that can convert commands typically identified as a first command state into another command state. For instance, words and/or phrases such as "help" and/or "version" can convert commands that can typically be identified as change commands into verify commands.

Thus, in various embodiments the mapping component 200 can identify a plurality of commands within a history of commands executed on one or more computing entities 106. The plurality of commands can be indicative of a policy that can be applicable to an existing policy as a code. The mapping component 200 can identify the plurality of commands by recognizing one or more patterns of commands within the command history. For example, the mapping component 200 can recognize repeating instances of a sequence of commands and/or a group of commands in the command history can facilitate identification of the plurality of commands. Further, the mapping component 200 can classify the plurality of commands as change commands and/or verify commands.

In one or more embodiments, the mining component 112 can compare a plurality of identified and/or classified actions comprised within a policy as a code with a plurality of identified and/or classified commands from a computing entity's 106 command history to determine whether the policy as a code is enforceable on the computing entity 106. For example, wherein the plurality of actions from the policy as a code perform the same operations as the plurality of commands from command history, the mining component 112 can determine that the policy as a code is applicable to the subject computing entity 106. In other words, a policy as a code can be determined, by the mining component 112, to be applicable to a subject computing entity 106 when the plurality of actions identified and/or classified by the mining component 112 match the plurality of commands identified and/or classified by the mapping component 200.

Further, the mining component 112 can compare multiple iterations of the plurality of actions with the plurality of commands. For example, in a first iteration of the comparison, all the actions comprised within policy as a code can be compared with the plurality of commands to determine whether the actions are the same as the commands (e.g., whether the actions delineate the same computer functions and/or operations as the commands). Wherein all the actions comprised within the policy as a code match the plurality of commands, the mining component 112 can determine that the policy as a code is applicable on the subject computing entity 106. In contrast, wherein not all the actions comprised within the policy code match the plurality of commands, a second iteration of the comparison can be performed by the mining component 112. In the second iteration, the mining component 112 can compare a plurality of actions from the policy as code with the plurality of commands extracted from the command history of the subject computing entity 106. The plurality of actions subject to comparison in the second iteration can be a subset of all the actions comprised within the policy as a code. The mining component 112 can form the subset by extracting the plurality of actions based on the action states. For example, the mining component 112 can form the plurality of actions by extracting all the change actions from the policy as a code but only a limited number of verify actions. Thus, the plurality of actions subject to comparison in the second iteration can comprise fewer verify actions than the collective group of actions subject to comparison in the first iteration.

Wherein the plurality of actions extracted from the policy as a code match the plurality of commands, the mining component 112 can determine that the policy as a code is applicable on the subject computing entity 106. In contrast, where not all of the plurality of actions extracted from the policy as a code match the plurality of commands, one or more further iterations of the comparison can be performed by the mining component 112. The one or more further iterations can repeat one or more features of the second iteration to generate unique action combinations for the subject comparison. With each further iteration, the plurality of actions extracted from the policy as a code can comprise fewer verify actions. The number of comparison iterations that can performed by the mining component 112 can be defined by a user of a system 100.

Additionally, in various embodiments the mining component 112 can compare the actions of a policy as a code with the commands of a plurality of computing entities 106 to identify one or more computing entities 106 upon which the policy as a code is applicable. For example, the mapping component 200 can identify and/or classify respective pluralities of commands for multiple computing entities 106 in the system 100. Further, the mining component 112 can perform the first comparison iteration with each respective plurality of commands. Wherein a match is found between the actions subject to the comparison in the first iteration and a respective plurality of commands, the computing entity 106 associated with the matched respective plurality of commands can be marked by the mining component 112 as an enforcement candidate and not subject to subsequent comparison iterations. The mining component 112 can then perform further comparison iterations (e.g., with each iteration comprising a different composition of actions by modifying the number of verify actions extracted from the policy as a code) with the remaining unmatched respective plurality of commands, wherein computing entities 106 can be marked as enforcement candidates for the policy as a code in response to their associated plurality of commands matching a plurality of actions subject to a given comparison iteration. The mining component 112 can perform multiple comparison iterations until: there are no longer any unmatched computing entities 106 to facilitate a comparison, the number of iterations reaches a user defined limit, and/or there are no further variations of the plurality of actions that can be generated to facilitate a new comparison.

Moreover, in various embodiments the mining component 112 can compare the actions of a policy as code with one or more subsets of the plurality of commands identified and/or classified by the mapping component 200. For example, the mapping component 200 can generate one or more subsets of the plurality of commands by varying the composition of the commands subject to comparison during a give iteration. The mapping component 200 can form the subset by extracting commands from the plurality of commands identified and/or classified by the mapping component 200 based on the command states. For instance, the mapping component 200 can form the subset of commands by extracting all the change commands from the plurality of commands but only a limited number of verify commands. Thus, the commands comprised within the subset of commands can include fewer verify commands than the total plurality of commands identified and/or classified by the mapping component 200.

Thus, the mining component 112 can compare a policy as a code with commands executed on multiple computing entities 106 to identify one or more computing entities 106 where the policy as a code is applicable. Further, the comparison can comprise multiple iterations, wherein each iteration can regard a different composition of action characterizing the policy as a code and/or a different composition of commands executed on the one or more computing entities 106. Unique compositions of actions can be generated by the mining component 112 by modifying the number of verify actions extracted from the policy as a code while extracting all the change actions comprised with the policy as a code. Different compositions of commands can be generated by the mapping component 200 by modifying the number of command actions extracted from the plurality of commands identified and/or classified by the mapping component 200 while extracting all the change commands comprised within the plurality of commands. Thus, iterations of comparisons performed by the mining component 112 can compare: the actions of a policy code to one or more pluralities of commands executed on one or more computing entities 106, a modified composition of the actions of a policy as a code to the plurality of commands, the actions of a policy code to a modified composition of the plurality of commands, and/or a modified composition of the actions of a policy as a code to a modified composition of the plurality of commands. Advantageously, the multiple action compositions and/or command compositions generated to facilitate the multiple comparison iterations can facilitate determining that a policy as a code is applicable to a subject computing entity 106 even when the command history of the computing entity 106 is not identical to an entirety of the policy as a code.

In one or more embodiments, the mapping component 200 can compare a plurality of identified and/or classified commands with a plurality of identified and/or classified actions to determine whether a policy as a code is applicable to a subject computing entity 106. For example, wherein the plurality of actions from the policy as a code perform the same operations as the plurality of commands from command history, the mapping component 200 can determine that the policy as a code is applicable to the subject computing entity 106. In other words, a policy as a code can be determined, by the mapping component 200, to be applicable to a subject computing entity 106 when the plurality of actions identified and/or classified by the mining component 112 match the plurality of commands identified and/or classified by the mapping component 200.

Further, the mapping component 200 can compare multiple iterations of the plurality of commands with the actions of the policy as a code. For example, in a first iteration of the comparison, all the plurality of commands can be compared with the actions of the policy as a code to determine whether the commands are the same as the actions (e.g., whether the commands delineate the same computer functions and/or operations as the actions). Wherein all the plurality of commands identified and/or classified by the mapping component 200 match the actions comprised within the policy as a code, the mapping component 200 can determine that the policy as a code is applicable on the subject computing entity 106. In contrast, wherein not all the plurality of commands match the actions of the policy as a code, a second iteration of the comparison can be performed by the mapping component 200. In the second iteration, the mapping component 200 can compare a subset of the plurality of commands with the actions of the policy as a code. The commands subject to comparison in the second iteration can be a subset of the plurality of commands identified and/or classified by the mapping component 200. The mapping component 200 can form the subset by extracting commands from the plurality of commands based on the command states. For example, the mapping component 200 can form the subset of commands by extracting all the change commands from the plurality of commands but only a limited number of verify commands. Thus, the plurality of commands subject to comparison in the second iteration can comprise fewer verify commands than the plurality of commands subject to comparison in the first iteration.

Wherein the subset of commands extracted from the plurality of commands match the actions of the policy as a code, the mapping component 200 can determine that the policy as a code is applicable on the subject computing entity 106. In contrast, where not all of the subset of commands extracted from the plurality of commands match the actions of the policy as a code, one or more further iterations of the comparison can be performed by the mapping component 200. The one or more further iterations can repeat one or more features of the second iteration to generate unique command combinations for the subject comparison. With each further iteration, the subset of commands extracted from the plurality of commands identified and/or classified by the mapping component 200 can comprise fewer verify commands. The number of comparison iterations that can performed by the mapping component 200 can be defined by a user of a system 100.

Additionally, in various embodiments the mapping component 200 can compare the command history of a subject computing entity 106 with the respective actions of multiple policies as a code to identify one or more policies as a code that are applicable to the computing entity 106. For example, the mining component 112 can identify and/or classify respective actions of a plurality of policies as a code (e.g., which can be stored in the policy as a code repository 120). Further, the mapping component 200 can perform the first comparison iteration with respect to the actions of each policy as a code respectively. Wherein a match is found between the commands subject to the comparison in the first iteration and the actions of a respective policy as a code, the policy as a code comprising the matched actions can be marked by the mapping component 200 as an enforcement candidate and not subject to subsequent comparison iterations. The mapping component 200 can then perform further comparison iterations (e.g., with each iteration comprising a different composition of commands by modifying the number of verify commands extracted from the plurality of commands identified and/or classified by the mapping component 200) with the remaining unmatched actions of respective policies as a code, wherein policies as a code can be marked as applicable for the computing entity 106 in response to their actions matching a subset of commands subject to a given comparison iteration. The mapping component 200 can perform multiple comparison iterations until: there are no longer any unmatched policies as a code to facilitate a comparison, the number of iterations reaches a user defined limit, and/or there are no further variations of the plurality of commands that can be generated to facilitate a new comparison.

Thus, the mapping component 200 can compare commands executed on a computing entity 106 with multiple policies as a code to identify one or more policies as a code applicable to the subject computing entity 106. Further, the comparison can comprise multiple iterations, wherein each iteration can regard a different composition of commands characterizing the commands executed on the computing entity 106. Moreover, respective compositions of commands can be generated by the mapping component 200 by modifying the number of verify commands extracted from the plurality of commands identified and/or classified by the mapping component 200 while extracting all the change commands comprised within the plurality of commands. Advantageously, the multiple command compositions generated to facilitate the multiple comparison iterations can facilitate determining that a policy as a code is applicable to a subject computing entity 106 even when the command history of the computing entity 106 is not identical to an entirety of the policy as a code.

Figure 3:
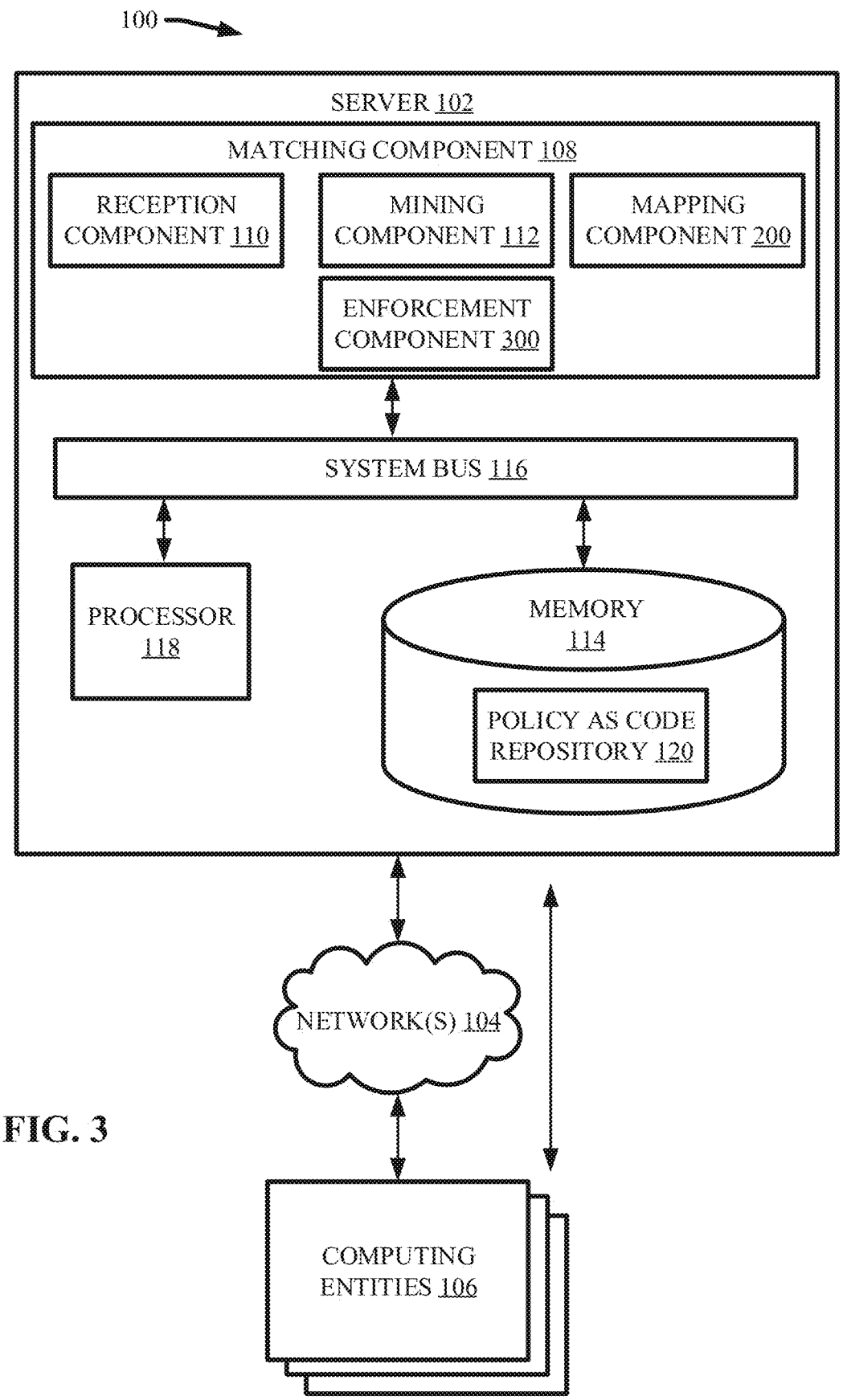
FIG. 3 illustrates a block diagram of an example, non-limiting system that can autonomously enforce a policy as a code on a computing entity based on a determination that the policy is applicable to one or more functions performed on the computing entity in accordance with one or more embodiments described herein.

FIG. 3 illustrates a diagram of the example, non-limiting system 100 further comprising an enforcement component 300 that can enforce one or more policies as a code on one or more computing entities 106 in response to comparisons facilitated by the mining component 112 and/or the mapping component 200 in accordance with one or more embodiments described herein. Repetitive description of like elements employed in other embodiments described herein is omitted for sake of brevity.

Where a comparison (e.g., by the mining component 112 and/or the mapping component 200) of the actions of a policy as a code and the commands executed on a computing entity 106 match, the enforcement component 300 can enforce the applicable policy as a code on the subject computing entity 106. For example, the enforcement component 300 can enforce a subject policy as a code on one or more computing entities 106 marked as enforcement candidates by the mining component 112 as a result of one or more comparison iteration in accordance with the various embodiments described herein. In another example, the enforcement component 300 can enforce one or more policies as a code on a subject computing entity 106 in response to the one or more policies as a code being determined to be applicable by the mapping component 200 as a result of one or more comparison iterations in accordance with various embodiments described herein. Therefore, in one or more embodiments the matching component 108 can autonomously identify (e.g., via the mining component 112 and/or the mapping component 200) where a policy as a code is applicable to a computing entity 106 and/or enforce (e.g., via the enforcement component 300) the policy as a code on the computing entity 106 based on the identification.

Figure 4:
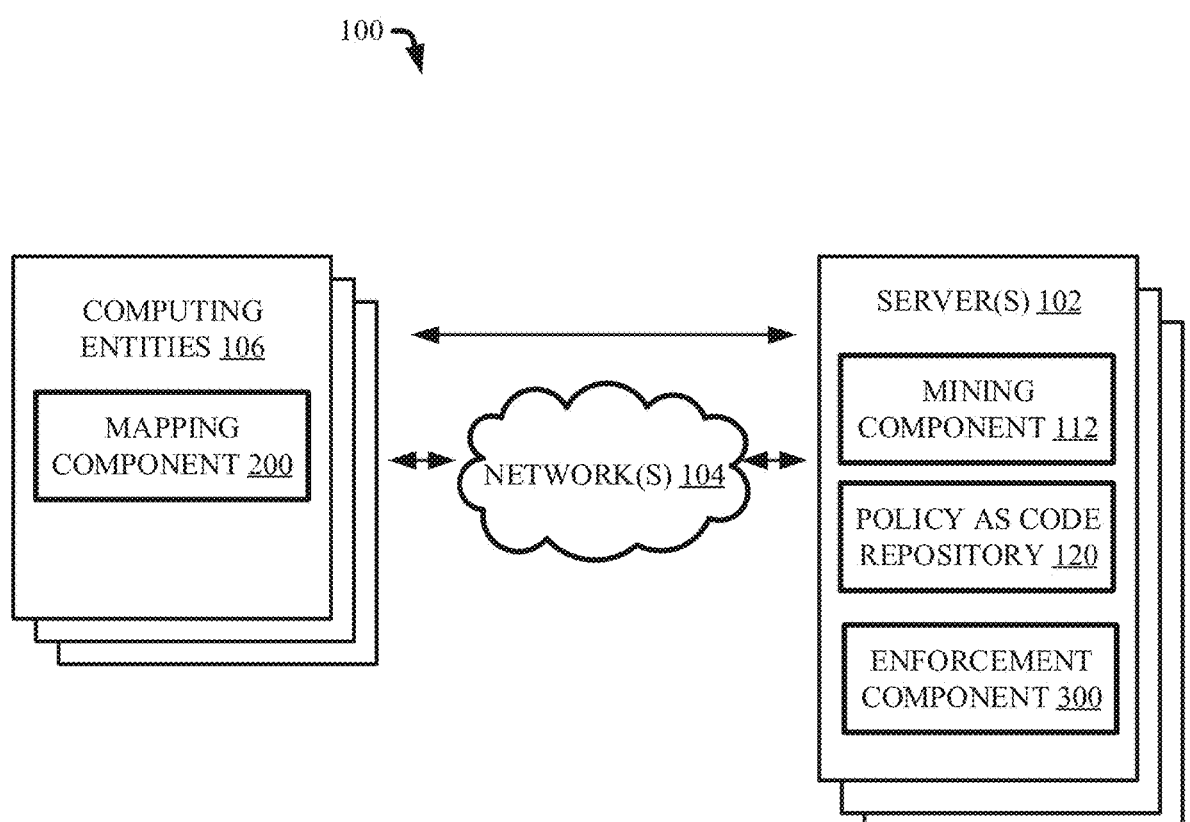
FIG. 4 illustrates a block diagram of an example, non-limiting system that can autonomously determine whether a policy as code is applicable on a subject computing entity using a decentralized architecture in accordance with one or more embodiments described herein.

FIG. 4 illustrates another diagram of the example, non-limiting system 100 utilizing a decentralized architecture to facilitate determining whether a policy as code is applicable on a subject computing entity 106 in accordance with one or more embodiments described herein. Repetitive description of like elements employed in other embodiments described herein is omitted for sake of brevity. As shown in FIG. 4, the system 100 can be deployed as a distributed software system, wherein identifying and/or classifying the plurality of commands can be performed by the mapping component 200 on one or more target computing entities 106.

While FIGS. 1-3 depict the matching component's 108 associate components (e.g., reception component 110, mining component 112, mapping component 200, and/or enforcement component 300) located on a central server 102, the architecture of the system 100 is not so limited. For example, the system 100 can comprise one or more mapping components 200 located on the one or more computing entities 106. By locating the one or more mapping component 200 on the one or more computing entities 106, the system 100 does not require the command histories of the computing entities 106 to be moved to a centralized location. In other words, the command histories (e.g., the audit logs) of the one or more computing entities 106 can remain stored on the computing entities 106 without impeding the functionality of the system 100.

Figure 5:
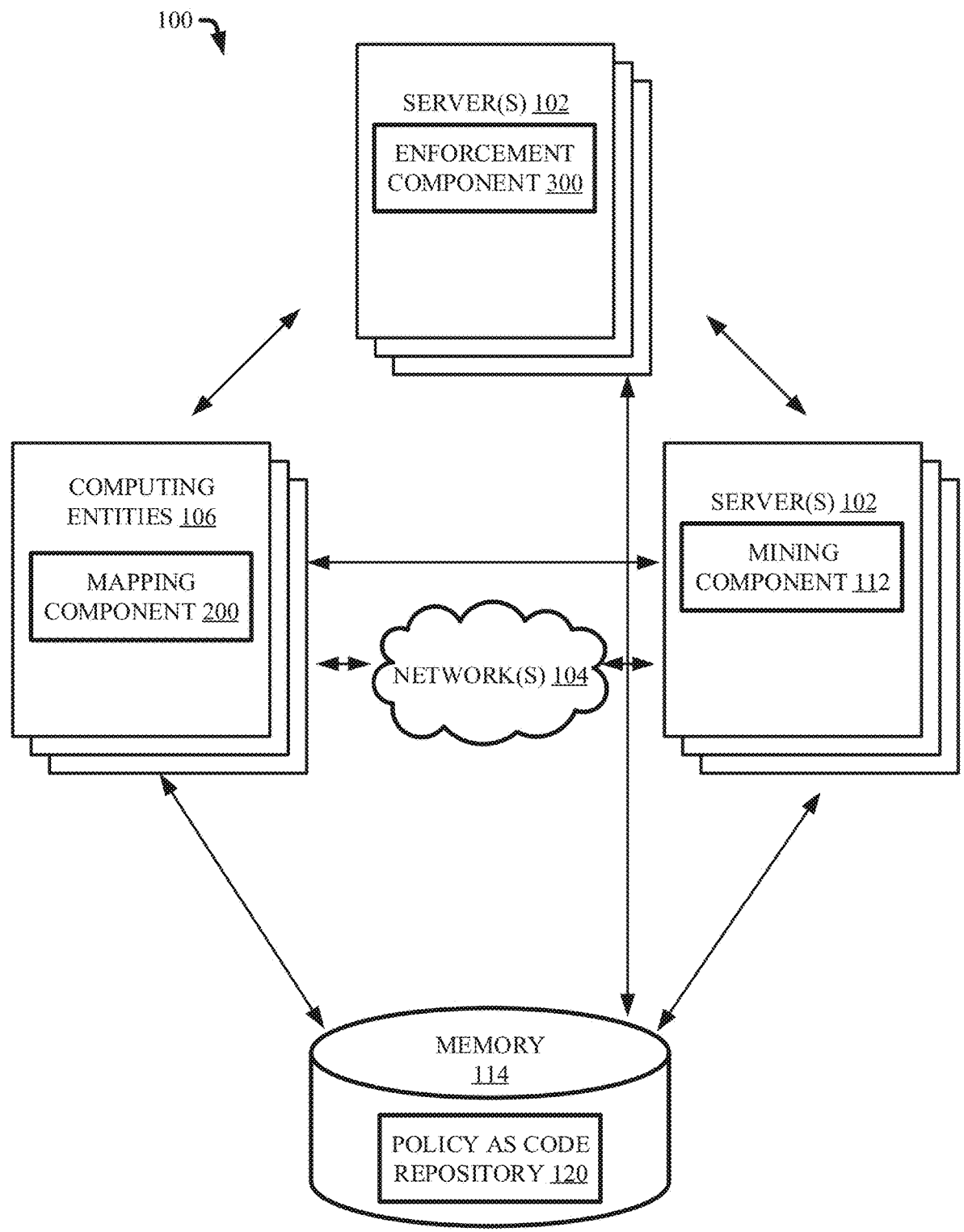
FIG. 5 illustrates a block diagram of an example, non-limiting system that can autonomously determine whether a policy as code is applicable on a subject computing entity using a decentralized architecture in accordance with one or more embodiments described herein.

FIG. 5 illustrates another diagram of the example, non-limiting system 100 utilizing a decentralized architecture to facilitate determining whether a policy as code is applicable on a subject computing entity 106 in accordance with one or more embodiments described herein. Repetitive description of like elements employed in other embodiments described herein is omitted for sake of brevity. As shown in FIG. 5, the various components of the system 100 can be further located on separate devices and operatively coupled directly (e.g., via electrical connection) and/or indirectly (e.g., via the one or more networks 104). For example, the various components of the system 100 can be located on multiple devices within a cloud computing environment. Decentralizing the location of the system's 100 components amongst a plurality of devices (e.g., a plurality of servers 102) can expedite one or more processes performed by the system 100 by sharing the computational workload. Additionally, implementing the system 100 via a decentralized architecture (e.g., as shown in FIG. 5) can facilitate in meeting one or more security standards for the system 100.

Figure 6:
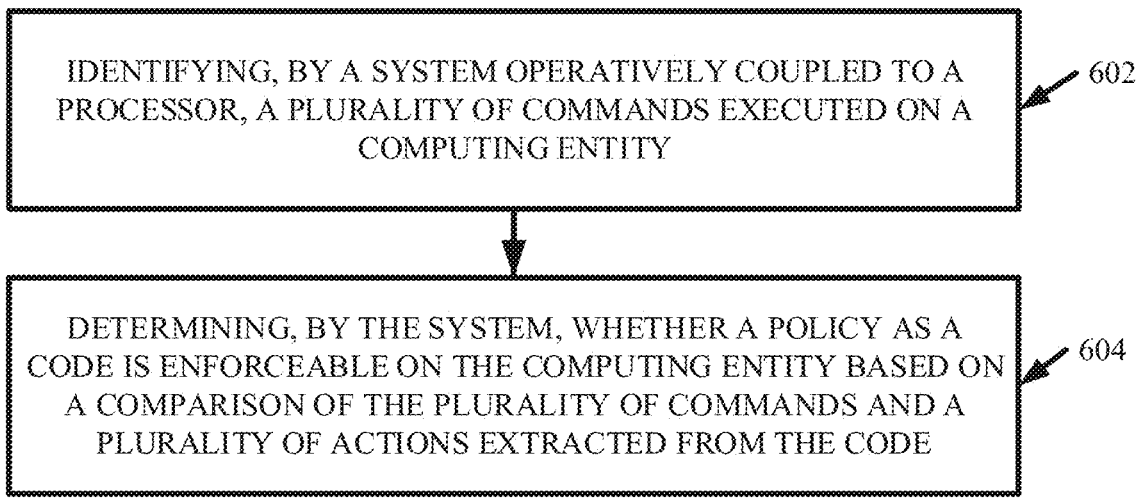
FIG. 6 illustrates a flow diagram of an example, non-limiting method that can facilitate autonomously determining whether a policy as code is applicable on a subject computing entity in accordance with one or more embodiments described herein.

FIG. 6 illustrates a flow diagram of an example, non-limiting method 600 that can facilitate autonomously determining whether a policy as code is applicable on a subject computing entity 106 in accordance with one or more embodiments described herein. Repetitive description of like elements employed in other embodiments described herein is omitted for sake of brevity.

At 602, the method 600 can comprise identifying, by a system 100 (e.g., via the mapping component 200) operatively coupled to a processor 118, a plurality of commands executed on one or more computing entities 106. The plurality of commands can be commands entered into the one or more computing entities 106 by: one or more users of the one or more computing entities 106, one or more computer readable program instructions; one or more artificial intelligence algorithms (e.g., one or more machine learning technologies), a computerized device (e.g., a cloud computing entity), a combination thereof, and/or the like. Also, the plurality of commands can be identified (e.g., by the mapping component 200) from a command history (e.g., an audit log) that can be generated, updated, and/or otherwise maintained by the one or more computing entities 106. Further, the plurality of commands can be identified (e.g., by the mapping component 200) based on one or more patterns in the command history. For example, the patterns can comprise repeated sequences of commands and/or repeated groups of commands. The patterns, and thus the identified plurality of commands, can be indicative that a policy as a code can be applicable to the one or more computing entities 106.

At 604, the method 600 can comprise determining, by the system 100 (e.g., via the mining component 112 and/or the mapping component 200), whether a policy as a code is enforceable on the one or more computing entities 106 based on a comparison of the plurality of commands identified at 602 and a plurality of actions extracted from the code. For example, the system 100 (e.g., via the mining component 112) can use one or more artificial intelligence technologies such as NPL to identify actions comprised within the policy as a code. Further, the system 100 (e.g., via the mining component 112) can identify the action states of the various actions within the policy as a code to facilitate the comparison at 604.

In one or more embodiments, the comparison at 604 can comprise multiple comparison iterations, wherein each iteration can regard a unique composition of the actions of the policy as a code and/or a unique composition of the plurality of commands in accordance with the various embodiments described herein. For example, unique compositions of the actions and/or commands can be generated (e.g., by the mining component 112 and/or the mapping component 200) based on identified action states and/or command states. Wherein the comparison at 604 finds that the plurality of commands match the plurality of actions, the method 600 can further comprise enforcing the policy as a code on the one or more computing entities 106.

Figure 7:
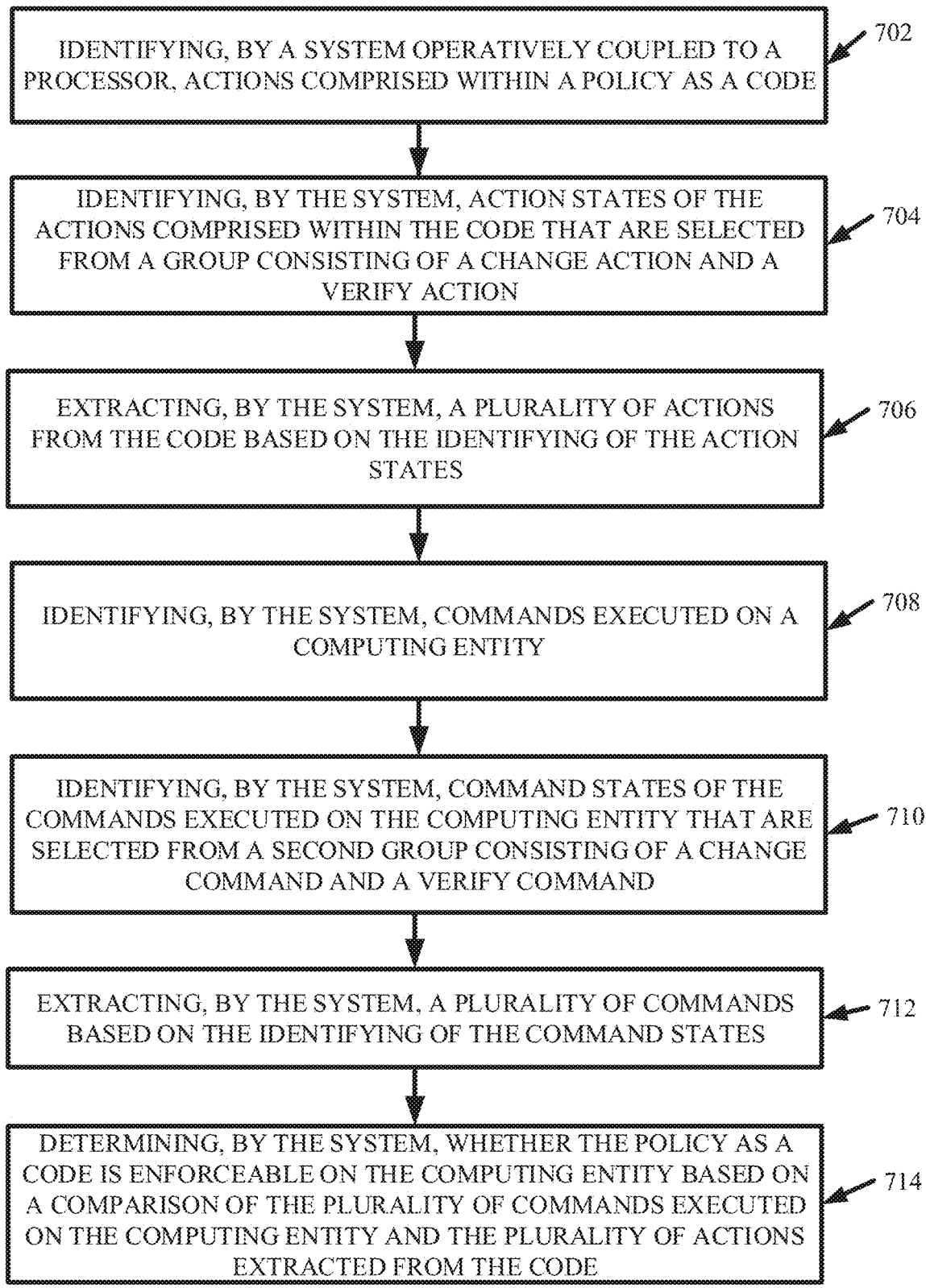
FIG. 7 illustrates a flow diagram of an example, non-limiting method that can facilitate autonomously determining whether a policy as code is applicable on a subject computing entity in accordance with one or more embodiments described herein.

FIG. 7 illustrates a flow diagram of an example, non-limiting method 600 that can facilitate autonomously determining whether a policy as code is applicable on a subject computing entity 106 in accordance with one or more embodiments described herein. Repetitive description of like elements employed in other embodiments described herein is omitted for sake of brevity.

At 702, the method 700 can comprise identifying, by a system 100 (e.g., via the mining component 112) operatively coupled to a processor 118, actions comprised within a policy as a code. In various embodiments, the identifying at 702 can comprise the utilization (e.g., by the mining component 112) of one or more artificial intelligence technologies such as NLP to facilitate identification of the actions from unstructured text. Additionally, the identifying at 702 can be facilitated by an analysis of action descriptions included in one or more manual pages associated with the policy as a code in accordance with the various embodiments described herein.

At 704, the method 700 can comprise identifying, by the system 100 (e.g., via the mining component 112), states of actions comprised within the code that are selected from a group consisting of a change action and/or a verify action. For example, at 704 the system 100 (e.g., via the mining component 112) can analyze (e.g., using one or more NLP techniques) the actions identified at 702 for domain specific words and/or phrases and/or known operations to classify the actions as change actions or verify actions in accordance with one or more embodiments described herein.

At 706, the method 700 can comprise extracting, by the system 100 (e.g., via the mining component 112), a plurality of actions from the code based on the identifying of the action states at 704. For example, the plurality of actions extracted at 706 can comprise the change actions comprised within the policy as a code in addition to one or more verify actions comprised within the code. In one or more embodiments, the system 100 (e.g., via the mining component 112) can limit the number of verify actions extracted from the code while preserving extraction of the change actions. In another example, the plurality of actions extracted at 706 can comprise just the change actions comprised within the code.

At 708, the method 700 can comprise identifying, by the system 100 (e.g., via the mapping component 200), commands executed on a computing entity 106. The commands can be entered into the one or more computing entities 106 by: one or more users of the one or more computing entities 106, one or more computer readable program instructions, one or more artificial intelligence algorithms (e.g., one or more machine learning technologies), a computerized device (e.g., a cloud computing entity), a combination thereof, and/or the like. Also, the commands can be identified (e.g., by the mapping component 200) from a command history (e.g., an audit log) that can be generated, updated, and/or otherwise maintained by the one or more computing entities 106. Further, commands can be identified (e.g., by the mapping component 200) based on one or more patterns in the command history. For example, the patterns can comprise repeated sequences of commands and/or repeated groups of commands. The patterns, and thus the identified commands, can be indicative that a policy as a code can be applicable to the one or more computing entities 106.

At 710, the method 700 can comprise identifying, by the system 100 (e.g., the mapping component 200), states of commands identified at 708 that can be selected from a second group consisting of a change command and/or a verify command. For example, at 710 the system 100 (e.g., via the mapping component 200) can analyze (e.g., using one or more NLP techniques) the commands identified at 708 for domain specific words and/or phrases and/or known operations to classify the commands as change commands or verify commands in accordance with the various embodiments described herein.

At 712, the method 700 can comprise extracting, by the system 100 (e.g., the mapping component 200), a plurality of commands based on the identifying of the command states at 710. For example, the plurality of commands extracted at 712 can comprise the change commands comprised within the identified commands in addition to one or more verify commands comprised within the identified commands. In one or more embodiments, the system 100 (e.g., via the mapping component 200) can limit the number of verify commands extracted from the identified commands while preserving extraction of the change commands. In another example, the plurality of commands extracted at 712 can comprise just the change commands comprised within the identified commands.

At 714, the method 700 can comprise determining, by the system 100 (e.g., via the mining component 112 and/or the mapping component 200), whether the policy as a code is enforceable on the computing entity based on one or more comparisons of the plurality of commands extracted at 712 and/or the plurality of actions extracted at 706. For example, the one or more comparisons at 714 can comprise multiple comparison iterations, wherein each iteration can regard a unique composition of the actions of the policy as a code and/or a unique composition of the plurality of commands in accordance with the various embodiments described herein. For example, unique compositions of the actions and/or commands can be generated (e.g., by the mining component 112 and/or the mapping component 200) by repeating one or more of the extractions at 706 and 712, wherein different combinations of actions and/or commands are extract with each repetition. Wherein the comparison at 714 finds that the plurality of commands match the plurality of actions, the method 700 can further comprise enforcing the policy as a code on the computing entity 106.

One of ordinary skill in the art will recognize that the various features of the methods described herein (e.g., method 600 and/or method 700) can be implemented with the various embodiments of the exemplary system 100 described herein. Further, the one or more features of the methods described herein (e.g., method 600 and/or method 700) can be repeated one or more times to facilitate the various identifications, classifications, and/or determinations described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
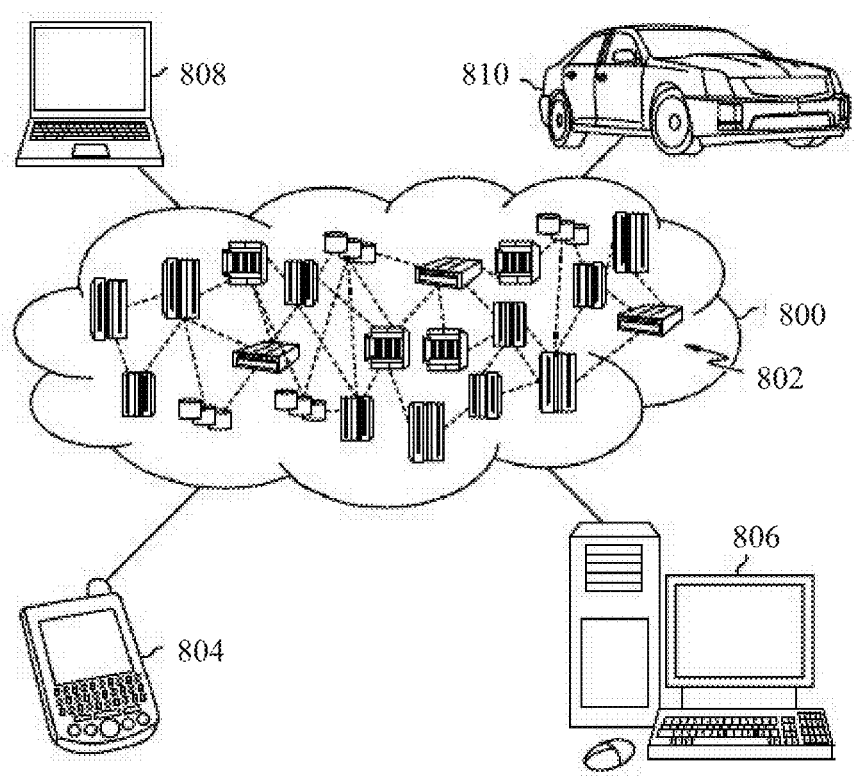
FIG. 8 depicts a cloud computing environment in accordance with one or more embodiments described herein.

Referring now to FIG. 8, illustrative cloud computing environment 800 is depicted. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
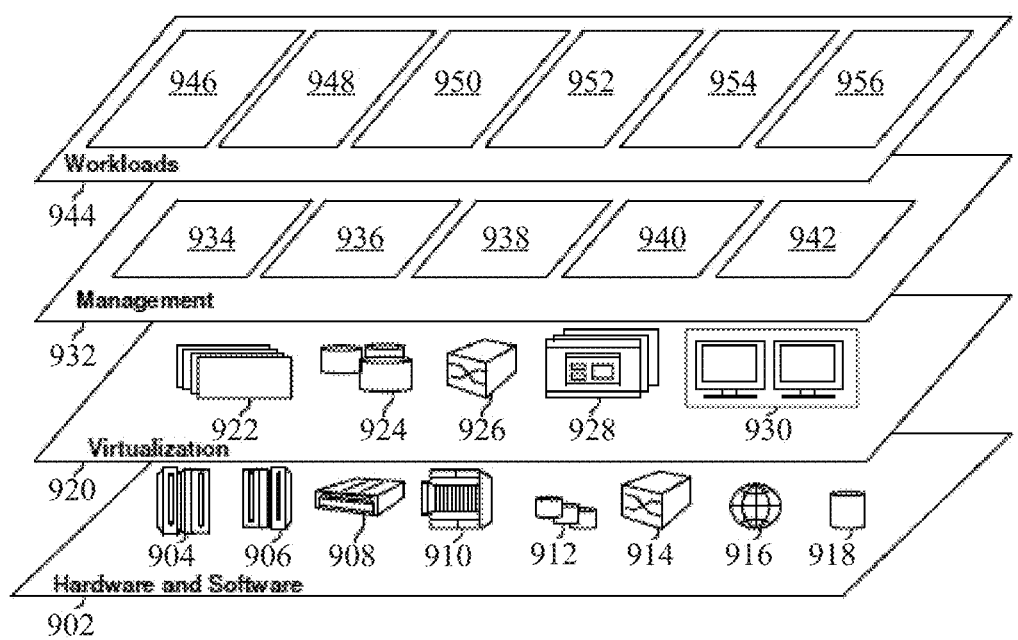
FIG. 9 depicts abstraction model layers in accordance with one or more embodiments described herein

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and policy as a code analyzing 956. Various embodiments of the present invention can utilize the cloud computing environment described with reference to FIGS. 8 and 9 to facilitate identifying one or more systems where a subject policy as a code can be applicable.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
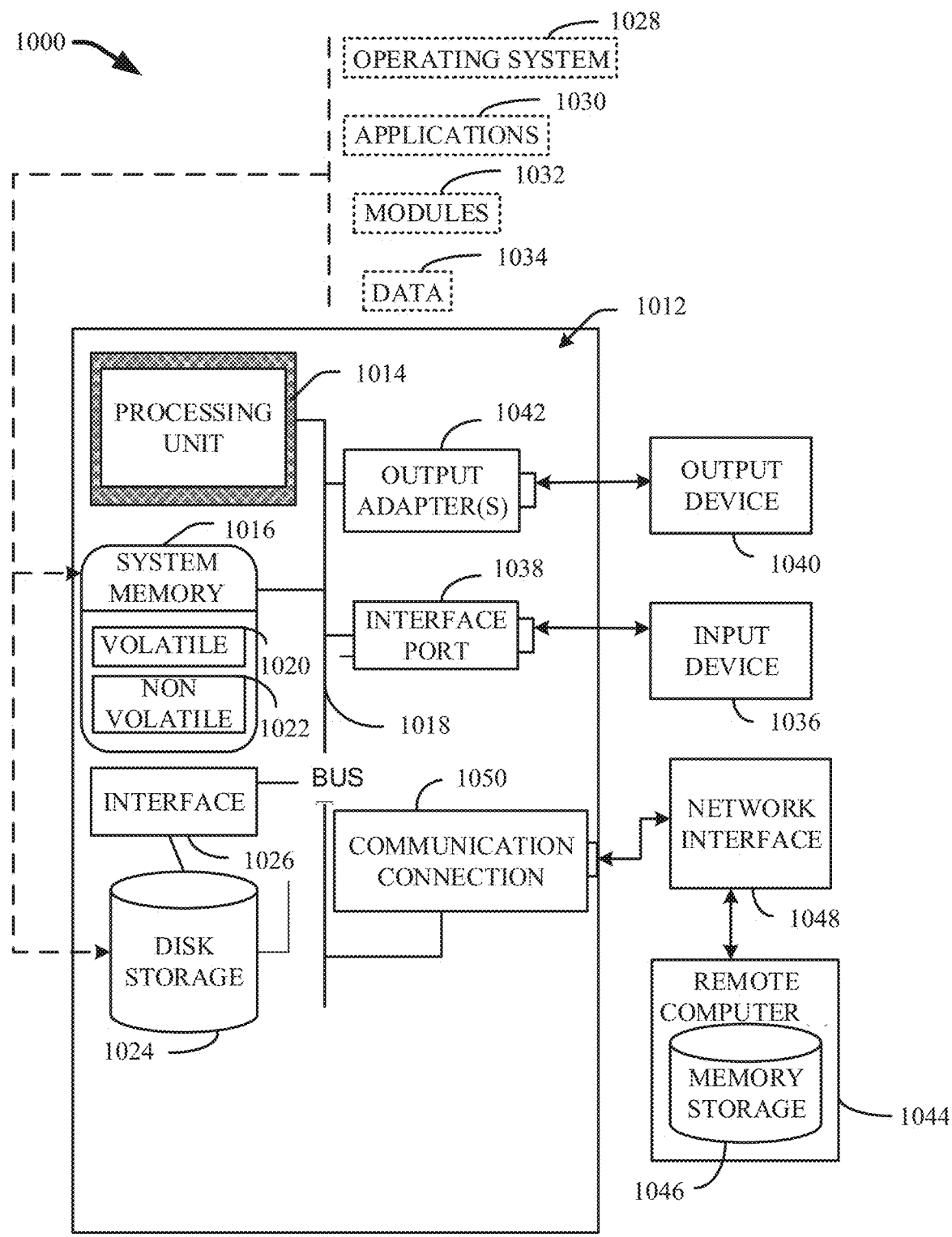
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor, operably coupled to the memory, and that executes the computer executable components stored in the memory, wherein the computer executable components comprise:
        a matching component, operatively coupled to the processor, that:
            compares a plurality of actions extracted from a policy as a code to a plurality of commands from a history of commands executed on a computing entity; and
            in response to determining that actions from the plurality of actions respectively have matching commands from the plurality of commands, determines that the policy as the code is enforceable on the computing entity.

2. The system of claim 1, wherein the matching component determines that an action matches a command based on the action and the command performing a same computer operation.

3. The system of claim 1, further comprising:
    a mining component, operatively coupled to the processor, that identifies states of the actions comprised within the code that are selected from a group consisting of a change action and a verify action.

4. The system of claim 3, wherein the change action changes a state of an entity, and wherein the verify action inquires as to the state of the entity.

5. The system of claim 3, wherein the mining component uses a natural language learning processing technique to analyze the code and identify the states of the actions.

6. The system of claim 3, wherein the plurality of actions is a subset of actions comprised within the code and is extracted from the code by the mining component based on the states of the actions identified.

7. The system of claim 3, further comprising:
    a mapping component, operatively coupled to the processor, that identifies states of commands from the plurality of commands that are selected from a second group consisting of a change command and a verify command.

8. The system of claim 7, wherein the change command changes a state of an entity, and wherein the verify command inquires as to the state of the entity.

9. The system of claim 7, wherein the mapping component uses a natural language learning processing technique to analyze the plurality of commands and identify the states of commands.

10. The system of claim 1, further comprising:
an enforcement component, operatively coupled to the processor, that enforces the policy as the code on the computing entity based on the determination by the matching component that the policy as the code is enforceable on the computing entity.

11. A computer-implemented method, comprising:
comparing, by at least one device operatively coupled to a processor, a plurality of actions extracted from a policy as a code to a plurality of commands from a history of commands executed on a computing entity; and
in response to determining that actions from the plurality of actions respectively have matching commands from the plurality of commands, determining, by the at least one device, that the policy as the code is enforceable on the computing entity.

12. The computer-implemented method of claim 11, further comprising:
identifying, by the at least one device, states of actions comprised within the code that are selected from a group consisting of a change action and a verify action.

13. The computer-implemented method of claim 12, further comprising:
extracting, by the at least one device, the plurality of actions from the code based on the identifying the states of actions.

14. The computer-implemented method of claim 13, further comprising:
identifying, by the at least one device, states of commands comprised within the plurality of commands that are selected from a second group consisting of a change command and a verify command.

15. The computer-implemented method of claim 14, further comprising:
implementing, by the at least one device, the policy as the code on the computing entity based the determination that the policy as the code is enforceable on the computing entity.

16. A computer program product for identifying a computing entity where a policy as a code is applicable, the computer program product comprising a computer readable storage medium having program instructions embodied therewith, the program instructions executable by a processor to cause the processor to:
compare a plurality of actions extracted from the policy as the code to a plurality of commands from a history of commands executed on the computing entity; and
in response to determining that actions from the plurality of actions respectively have matching commands from the plurality of commands, determine that the policy as the code is enforceable on the computing entity.

17. The computer program product of claim 16, wherein the program instructions further cause the processor to:
identify states of actions comprised within the code that are selected from a group consisting of a change action and a verify action; and
extract the plurality of actions from the code based on the states of actions.

18. The computer program product of claim 17, wherein the program instructions further cause the processor to:
identify states of commands comprised within the plurality of commands that are selected from a second group consisting of a change command and a verify command.

19. The computer program product of claim 18, wherein the program instructions further cause the processor to:
implement the policy as the code on the computing entity based the determination that the policy as the code is enforceable on the computing entity.

20. The computer program product of claim 19, wherein the comparison of the plurality of commands and the plurality of actions are performed in a cloud computing environment.

* * * * *